United States Patent
Yoon et al.

(10) Patent No.: US 11,539,926 B2
(45) Date of Patent: Dec. 27, 2022

(54) IMMERSIVE DISPLAY DEVICE

(71) Applicant: Korea Photonics Technology Institute, Gwangju (KR)

(72) Inventors: Seon Kyu Yoon, Gwangju (KR); Sung Kuk Chun, Gwangju (KR); Ha Mong Shim, Gwangju (KR); Sungjoon Kim, Gwangju (KR)

(*) Notice: Subject to any disclaimer, the term of this patent is extended or adjusted under 35 U.S.C. 154(b) by 0 days.

(21) Appl. No.: 17/160,641

(22) Filed: Jan. 28, 2021

(65) Prior Publication Data

US 2022/0210383 A1    Jun. 30, 2022

(30) Foreign Application Priority Data

Dec. 30, 2020  (KR) .................. 10-2020-0188517

(51) Int. Cl.
*H04N 9/31* (2006.01)
*G06F 3/01* (2006.01)

(52) U.S. Cl.
CPC .......... *H04N 9/3152* (2013.01); *G06F 3/011* (2013.01); *G06F 3/013* (2013.01)

(58) Field of Classification Search
CPC .............................. H04N 9/3152; G06F 3/013
See application file for complete search history.

(56) References Cited

U.S. PATENT DOCUMENTS

| | | | | |
|---|---|---|---|---|
| 2016/0191888 | A1* | 6/2016 | Blonde | G06T 3/40 348/43 |
| 2016/0309081 | A1* | 10/2016 | Frahm | G06V 40/19 |
| 2016/0378183 | A1* | 12/2016 | Teshome | G06V 40/165 382/100 |
| 2018/0130264 | A1* | 5/2018 | Ebacher | G11B 27/34 |
| 2018/0374456 | A1* | 12/2018 | Mu | G09G 5/005 |
| 2021/0364900 | A1* | 11/2021 | Hsien | G03B 21/2066 |

FOREIGN PATENT DOCUMENTS

| | | |
|---|---|---|
| KR | 10-2016-0071797 | 6/2016 |
| KR | 10-2020-0053320 | 5/2020 |
| KR | 10-2020-0101044 | 8/2020 |
| KR | 10-2020-0130046 | 11/2020 |

OTHER PUBLICATIONS

English Specification of 10-2020-0053320.
English Specification of 10-2020-0130046.
English Specification of 10-2020-0101044.
English Specification of 10-2016-0071797.

(Continued)

*Primary Examiner* — Mark Edwards
*Assistant Examiner* — Chayce R Bibbee
(74) *Attorney, Agent, or Firm* — Antonio Ha & U.S. Patent, LLC

(57) ABSTRACT

According to an embodiment, an image projection device outputting an image to a screen comprises an input unit receiving an image from an outside, a sensor unit sensing a viewer's position and gaze direction, a controller correcting the received image into a preset model based on the viewer's position and gaze direction sensed by the sensor unit, and an output unit outputting the preset model.

6 Claims, 5 Drawing Sheets

(56) References Cited

OTHER PUBLICATIONS

LG Display Newsroom, "Radius of curvature," https://news.lgdisplay.com/kr/2016/05/radius-curvature/, published on May 19, 2016.
Myeonghee Lee et al., "Optical Analysis of the Gullstrand's Schematic Human Eye and a Myopic Astigmatism Human Eye by Using Matrix Method," 2015, Korean J. Vis. Sci. vol. 17, No. 3, pp. 196-198.
Translation of LG Display Newsroom, "Radius of curvature," https://news.lgdisplay.com/kr/2016/05/radius-curvature/, published on May 19, 2016.
Translation of Myeonghee Lee et al., "Optical Analysis of the Gullstrand's Schematic Human Eye and a Myopic Astigmatism Human Eye by Using Matrix Method," 2015, Korean J. Vis. Sci. vol. 17, No. 3, pp. 196-198.

* cited by examiner 120, 130

IMMERSIVE DISPLAY DEVICE

CROSS-REFERENCE TO RELATED APPLICATIONS

This application is based on and claims priority under 35 U.S.C. 119 to Korean Patent Application No. 10-2020-0188517, filed on Dec. 30, 2020, in the Korean Intellectual Property Office, the disclosure of which is herein incorporated by reference in its entirety.

TECHNICAL FIELD

Embodiments of the disclosure relate to immersive display devices that may increase viewers' sense of presence and minimize visual fatigue.

DESCRIPTION OF RELATED ART

The description of the Discussion of Related Art section merely provides information that may be relevant to embodiments of the disclosure but should not be appreciated as necessarily constituting the prior art.

Immersive display technology provides the observer with large-screen image information with a wide angle of view, providing a sense of presence. Accordingly, the observer may view images in a wide field of view.

Conventional immersive display devices are implemented with an output device for outputting large-screen images and a screen for viewing the images. Since the viewer's eyes have a parallax in recognizing the screen, even when the screen is implemented as a plane, the viewer does not perceive it as a plane but perceives it as having a curvature. Accordingly, the viewer may have inconvenience or feel distortion when looking at the edges of the image output to the screen.

To address such issues, curved screens with a predetermined curvature have been introduced. Such a screen attempts to minimize parallax by setting the same viewer-screen distance at the center and the edges. However, parallax still exists in such curved screens although its degree may be reduced. In particular, when the viewer moves the viewpoint in a different direction, parallax occurs, causing the viewer to perceive the image as curved, rather than flat.

SUMMARY

According to an embodiment of the disclosure, there is provided an immersive display device that outputs images that the viewer may perceive as flat or planar.

According to an embodiment of the disclosure, there is provided an immersive display device capable of outputting images to be perceived as flat or planar, corresponding to the viewer's position or direction of gaze.

According to an embodiment, an image projection device outputting an image to a screen comprises an input unit receiving an image from an outside, a sensor unit sensing a viewer's position and gaze direction, a controller correcting the received image into a preset model based on the viewer's position and gaze direction sensed by the sensor unit, and an output unit outputting the preset model.

The sensor unit may sense the viewer's position by measuring a distance between the screen and the viewer.

The preset model may be a set of intersection points where gaze directions from corresponding positions in predetermined retinal areas of the viewer's left and right eyes intersect or meet.

The controller may correct the received image based on a Gullstrand eye model.

The controller may correct the received image by distorting the received image or adjusting a tilt of the received image, and wherein adjusting the tilt of the received image includes creating a keystone effect.

The image output from the output unit may meet the viewer's angle of view of a predetermined value or more to prevent the viewer's gaze from escaping off the screen.

According to an embodiment, an immersive display device outputting an image comprises an image projection device including, an input unit receiving an image from an outside, a sensor unit sensing a viewer's position and gaze direction, a controller correcting the received image into a preset model based on the viewer's position and gaze direction sensed by the sensor unit, and an output unit outputting the preset model, and a screen projecting the image output from the immersive display device.

The screen may have the same or substantially the same shape as the preset model.

As described above, according to embodiments of the disclosure, it is possible to minimize discomfort or distortion by outputting an image that the viewer may perceive as flat.

According to embodiments of the disclosure, it is possible to allow the viewer to continuously perceive an image as flat regardless of his/her gaze position or gaze direction.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Various changes may be made to the disclosure, and the disclosure may come with a diversity of embodiments. Some embodiments of the disclosure are shown and described in connection with the drawings. However, it should be appreciated that the disclosure is not limited to the embodiments, and all changes and/or equivalents or replacements thereto also belong to the scope of the disclosure. Similar reference denotations are used to refer to similar elements throughout the drawings.

The terms "first" and "second" may be used to describe various components, but the components should not be limited by the terms. The terms are used to distinguish one component from another. For example, a first component may be denoted a second component, and vice versa without departing from the scope of the disclosure. The term "and/or" may denote a combination(s) of a plurality of related items as listed or any of the items.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

The terms as used herein are provided merely to describe some embodiments thereof, but not to limit the disclosure. As used herein, the singular forms "a," "an," and "the" are intended to include the plural forms as well, unless the context clearly indicates otherwise. As used herein, the term "comprise," "include," or "have" should be appreciated not to preclude the presence or addability of features, numbers, steps, operations, components, parts, or combinations thereof as set forth herein.

Unless otherwise defined, all terms including technical and scientific terms used herein have the same meaning as commonly understood by one of ordinary skill in the art to which the embodiments of the disclosure belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The components, processes, steps, or methods according to embodiments of the disclosure may be shared as long as they do not technically conflict with each other.

Figure 1:
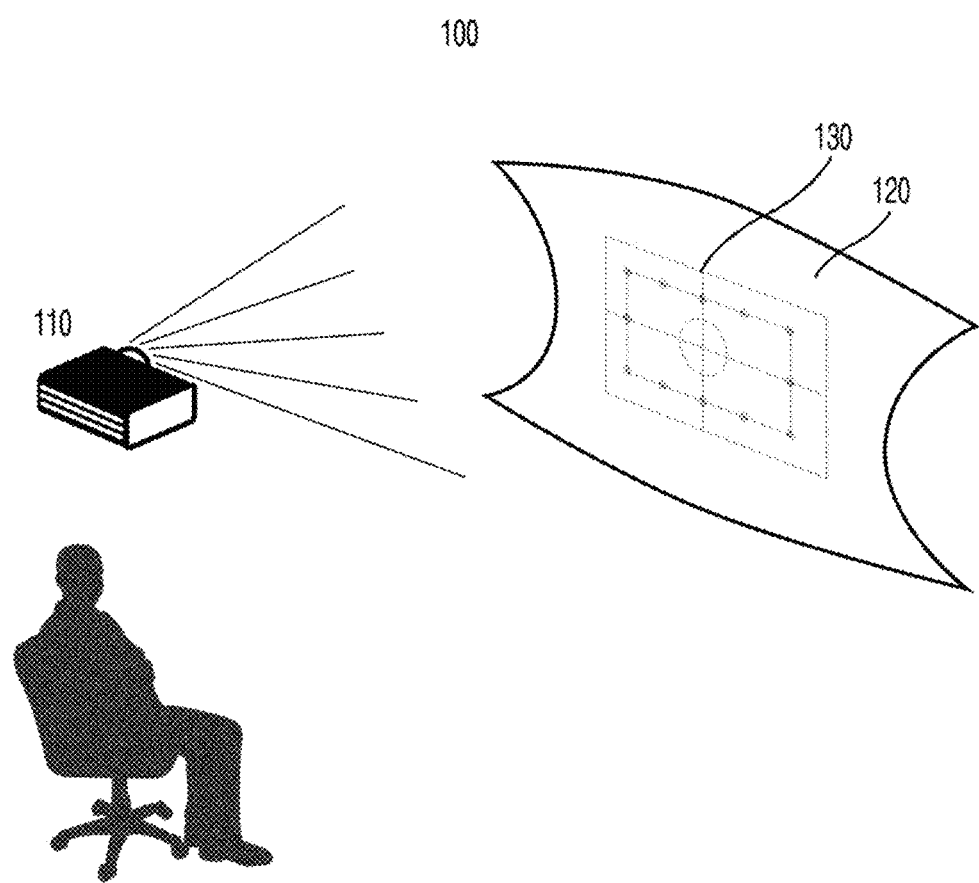
FIG. 1 is a view illustrating a configuration of an immersive display device according to an embodiment of the disclosure.

FIG. 1 is a view illustrating a configuration of an immersive display device according to an embodiment of the disclosure.

Referring to FIG. 1, an immersive display device 100 according to an embodiment of the disclosure may include an image projection device 110 for an immersive display and an immersive screen 120.

The image projection device 110 outputs a large screen image 130 having a high sense of presence.

The image projection device 110 outputs an image at a distance where the image may be flawlessly output to the immersive screen 120. The image projection device 110 may be located in a relatively higher position than the top of the immersive screen 120 or over the viewer so that the image output from the image projection device 110 is not covered or blocked by the viewer.

The image projection device 110 outputs an immersive image 130 having a high sense of presence. The immersive image 130 may mean an image that meets the viewer's viewing angle of a predetermined value or more (e.g., 60 degrees in the horizontal direction. The angle in the vertical direction differs depending on the screen ratio) to prevent the viewer's gaze from escaping off the screen. The immersive image 130 is not output as a two-dimensional plane, but rather as a model preset or predetermined to be recognized as a plane by the user. The preset model is implemented and output as illustrated in FIGS. 3 and 4.

Figure 3:
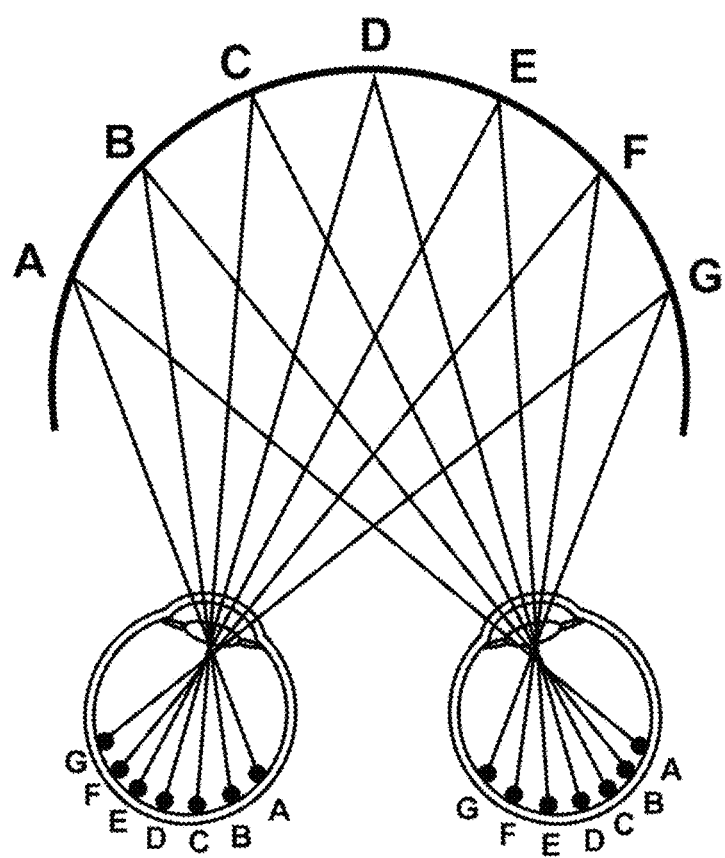
FIG. 3 is a view illustrating features of an image output from a display device according to an embodiment of the disclosure.

FIG. 3 is a view illustrating the features of an image output by a display device according to an embodiment of the disclosure. FIG. 4 is a view illustrating an example screen according to an embodiment of the disclosure.

Referring to FIG. 3, the immersive image 130 may be implemented as a preset model. Here, the preset model may be defined as follows. The preset model may refer to a set of points where the visual directions passing through the respective lenses of the left and right eyes of the viewer from the corresponding positions in predetermined areas of the retinas of the left and right eyes cross or meet each other (hereinafter, the points are referred to as "intersection points"). Here, the set of intersection points may mean a Horopter surface. Referring to the example illustrated in FIG. 3, the intersection point for points A (the same positions) in the retinas of the left eye and the right eye is point A outside the eyeballs. The intersection point for points B in the retinas of the left and right eyes is point B outside the eyeballs. As such, the intersection points for the entire area of the retina in the left and right eyes form a preset model (surface or set) as illustrated in FIG. 4.

Figure 4:
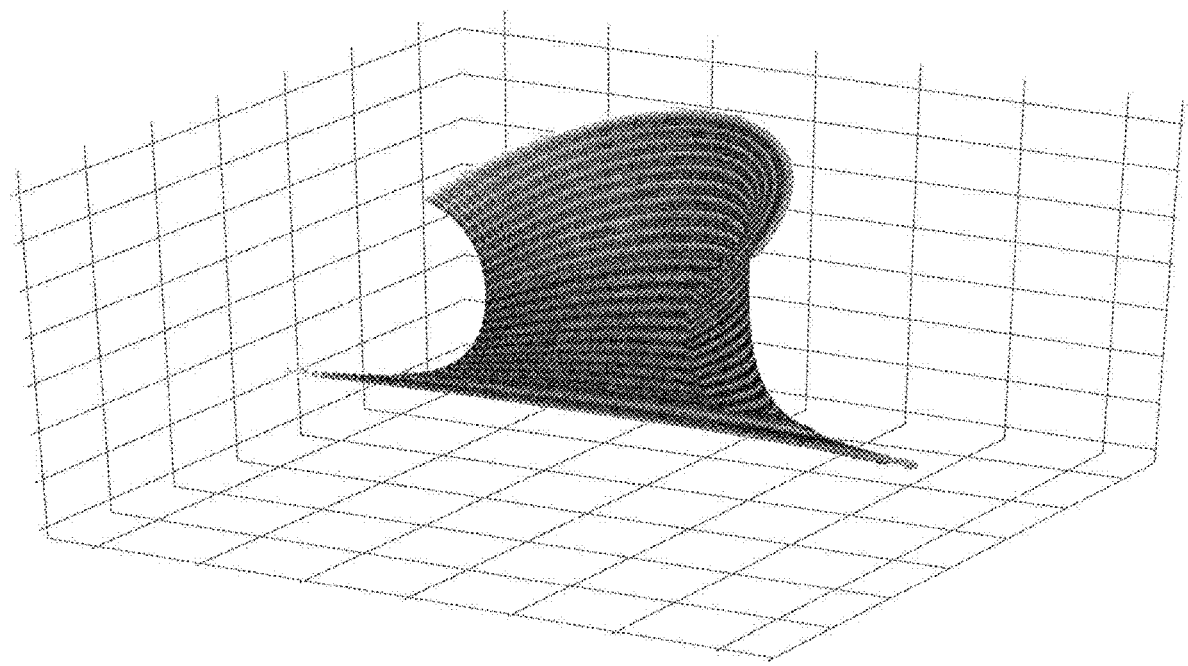
FIG. 4 is a view illustrating an example screen according to an embodiment of the disclosure.

FIG. 4 illustrates a set of intersection points when the viewer has a specific gaze direction in a position, and the surface connecting these points constitute the immersive screen 120. The set of intersection points for a predetermined area of the retina in each of the left eye and the right eye is not a mere two-dimensional plane or curved surface, but rather has a three-dimensional shape that is distorted and inclined in the length and height directions. Such a three-dimensional shape is perceived as a distorted and inclined three-dimensional shape to other persons who are out of the viewer's position, but is perceived as a plane to the viewer, thereby enhancing the sense of reality and immersion to the image.

Referring back to FIG. 1, the so-output image is displayed on the immersive screen 120 and recognized by the viewer. The intentional distortion and adjustment of the tilt by the image projection device 110 allow the immersive image 130 to be recognized as planar by the viewer.

The image projection device 110 senses the viewer's position and gaze direction and adjusts and outputs the immersive image 130. The viewer's viewing position may be changed for various reasons, e.g., his/her convenience or vision, and the viewer's gaze direction may also be varied while viewing the image. For example, the intersection points illustrated in FIG. 3 are intersection points when the viewer is looking forward and, when the viewer looks left or right, the intersection points from the corresponding points have different positions. If the same immersive image is output regardless of the change in the viewer's position or gaze direction, the sense of reality or immersion to the immersive image may be deteriorated. To prevent this, the image projection device 110 senses the viewer's position and gaze direction and adjusts the immersive image 130 accordingly.

The immersive screen 120 has a shape to allow the viewer to recognize the immersive image as planar while projecting the immersive image output from the image projection device 110. The immersive screen 120 projects the immersive image output from the image projection device 110. However, the immersive screen 120 is not implemented as a two-dimensional plane or a surface with a predetermined curvature, but rather has the shape of the preset model like the output image. Since the immersive screen 120 cannot change in real time as the immersive image output from the image projection device 110, the immersive screen 120 has the shape of a preset model in one position of the viewer. Since the immersive screen 120 also has the shape of the preset model, the viewer may perceive the immersive image output on the immersive screen 120 as planar.

Figure 2:
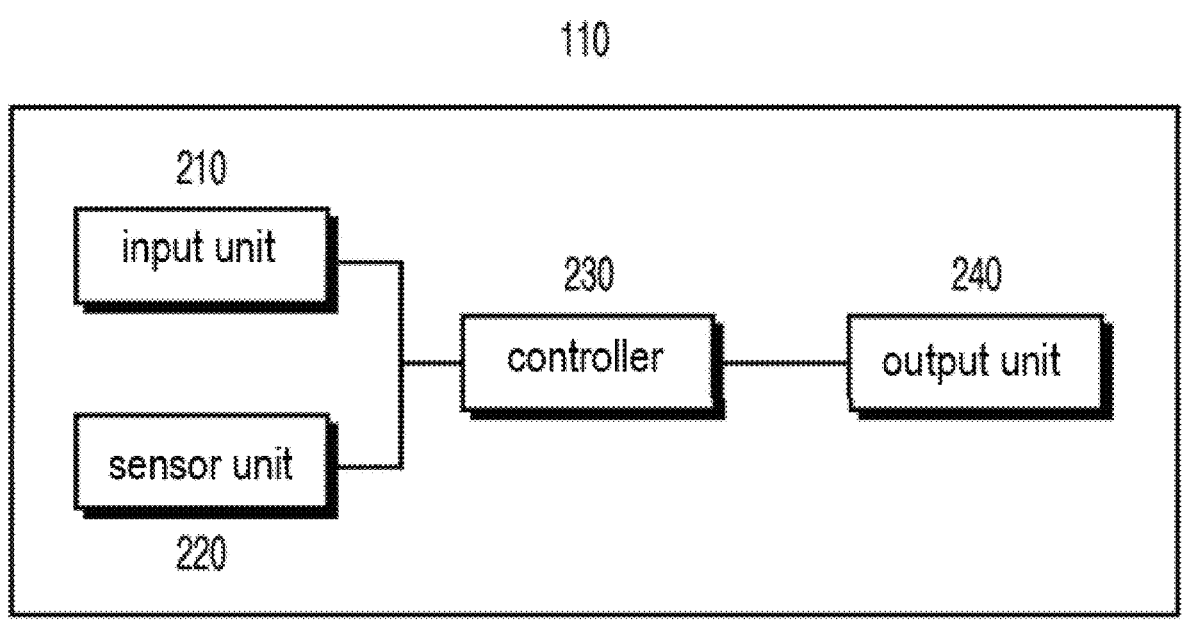
FIG. 2 is a view illustrating a configuration of a display device according to an embodiment of the disclosure.

FIG. 2 is a view illustrating a configuration of a display device according to an embodiment of the disclosure.

Referring to FIG. 2, according to an embodiment, an image projection device 110 for an immersive display may include an input unit 210, a sensor unit 220, a controller 230, and an output unit 240. The input unit 210 may be, or include, but is not limited to, a connector or communication device for wired or wireless communication with the outside (or an external device). The sensor unit 220 may be, or include, but is not limited to, a positioning sensor, a posture sensor, a motion sensor, a distance sensor, or other various sensors, or one or more cameras. The output unit 240 may be, or include, but is not limited to, a projector or display device.

The input unit 210 receives an immersive image to be output by the output unit 240 from the outside. The input unit 210 may receive an immersive image in real time or in advance from the outside. However, it may be preferable that the input unit 210 receives the immersive image from the outside in advance since the image may be required to be corrected and output according to the viewer's position and gaze direction.

The sensor unit 220 senses the viewer's position and gaze direction. The sensor unit 220 may be positioned on a side of, or near, the immersive screen 120 not to overlap the immersive image to be output, to sense the viewer's position and gaze direction. The sensor unit 220 may sense the viewer's position by sensing the distance between the sensor unit 220 and may sense the viewer's gaze direction by recognizing the viewer's head and determining the rotation angle of the head. However, embodiments of the disclosure are not limited thereto. For example, the sensor unit 220 may be any means that is capable of sensing the viewer's position and gaze direction, such as the viewer's three-dimensional (3D) coordinates or the movement of the pupils. The controller 230 corrects the immersive image received by the input unit 210 into a preset model based on the results sensed by the sensor unit 220. When the immersive image received by the input unit 210 is output as it is, the viewer may not perceive it as planar but feel distortion or parallax. Accordingly, the controller 230 deliberately distorts the immersive image or adjusts the tilt of the immersive image considering the viewer's position and gaze direction sensed by the sensor unit 220, thereby correcting the immersive image into a preset model. In the correction, the controller 230 sets the eye model as a Gullstrand eye model and performs calculation as illustrated in FIG. 5, thereby correcting the immersive image.

Figure 5:
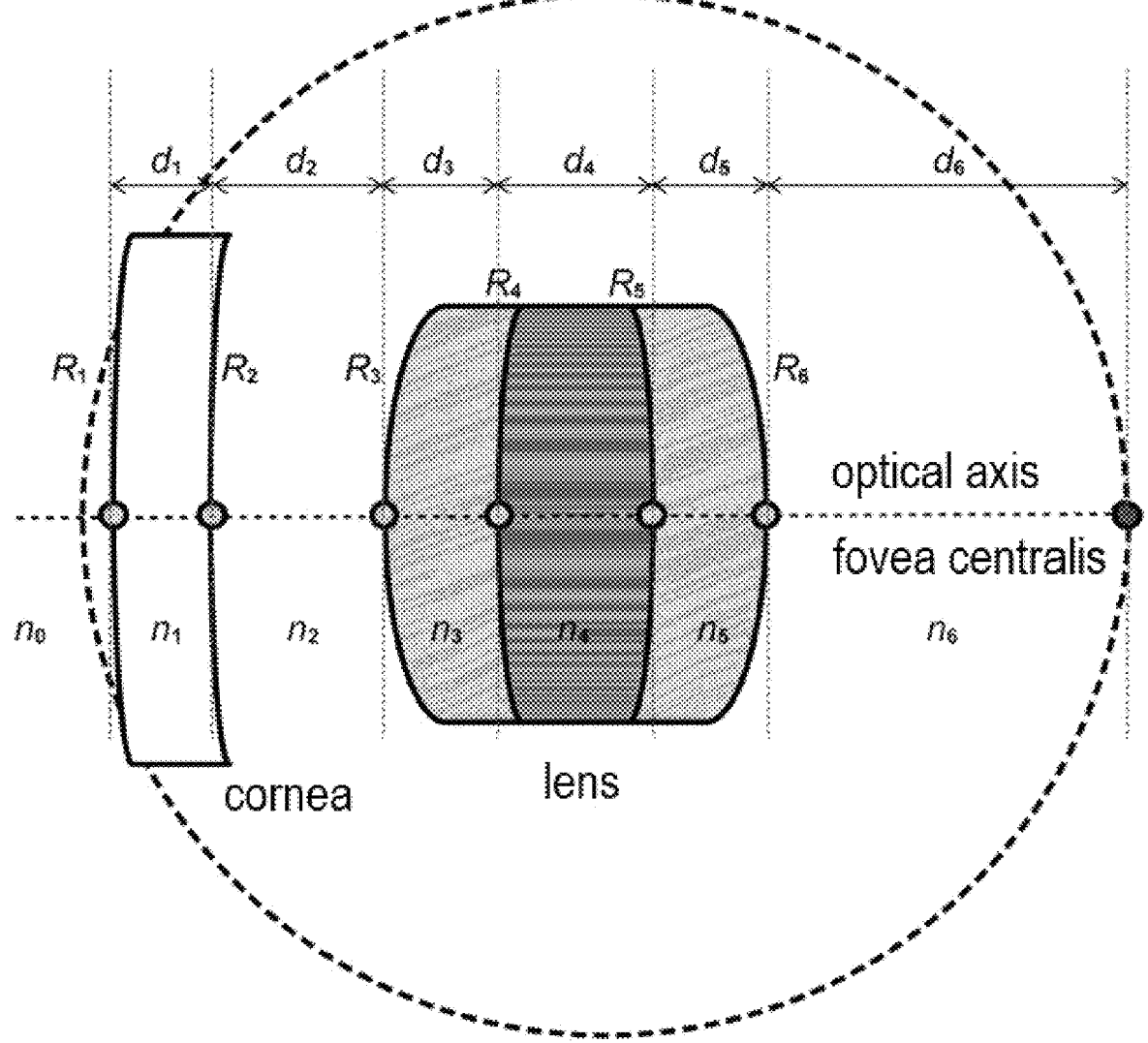
FIG. 5 is a view illustrating an eye model configured by a controller to correct an immersive image according to an embodiment of the disclosure.

FIG. 5 is a view illustrating an eye model configured by a controller to correct an immersive image according to an embodiment of the disclosure.

The controller 230 calculates an intersection point for one point of the retina in the left and right eyes based on the Gullstrand eye model as follows.

$$\begin{pmatrix} A & B \\ C & D \end{pmatrix} =$$

$$\begin{pmatrix} 1 & d_6 \\ 0 & 1 \end{pmatrix} \begin{pmatrix} 1 & 0 \\ \frac{R_5 - R_6}{R_6 \cdot R_6} & 1 \end{pmatrix} \begin{pmatrix} 1 & d_5 \\ 0 & 1 \end{pmatrix} \begin{pmatrix} 1 & 0 \\ \frac{R_4 - R_5}{R_5 \cdot R_5} & 1 \end{pmatrix} \begin{pmatrix} 1 & d_4 \\ 0 & 1 \end{pmatrix} \begin{pmatrix} 1 & 0 \\ \frac{R_3 - R_4}{R_4 \cdot R_4} & 1 \end{pmatrix}$$

$$\begin{pmatrix} 1 & d_3 \\ 0 & 1 \end{pmatrix} \begin{pmatrix} 1 & 0 \\ \frac{R_2 - R_3}{R_3 \cdot R_3} & 1 \end{pmatrix} \begin{pmatrix} 1 & d_2 \\ 0 & 1 \end{pmatrix} \begin{pmatrix} 1 & 0 \\ \frac{R_1 - R_2}{R_2 \cdot R_2} & 1 \end{pmatrix} \begin{pmatrix} 1 & d_1 \\ 0 & 1 \end{pmatrix} \begin{pmatrix} 1 & 0 \\ \frac{R_0 - R_1}{R_1 \cdot R_1} & 1 \end{pmatrix}$$

Here, d is the thickness (interval) between the points in the Gullstrand eye model, R is the radius of each point in the Gullstrand eye model, and n is the refractive index of each point in the Gullstrand eye model.

The controller 230 repeats the above-described equation and calculates a set of intersection points for a predetermined area of the retina in each of the left and right eyes, thereby correcting the immersive image into the preset model. In particular, the controller 230 calculates a set of intersection points in the above-described process considering the viewer's position and gaze direction sensed by the sensor unit 220. Based on the calculated results, the controller 230 distorts the immersive image and adjusts the tilt of the immersive image to thereby correct the immersive image into the preset model. Therefore, the viewer may view an optimal preset model that matches his/her position and gaze direction.

Referring back to FIG. 2, the controller 230 controls the output unit 240 to output the corrected preset model.

The output unit 240 outputs the preset model corrected by the controller 230.

The above-described embodiments are merely examples, and it will be appreciated by one of ordinary skill in the art various changes may be made thereto without departing from the scope of the disclosure. Accordingly, the embodiments set forth herein are provided for illustrative purposes, but not to limit the scope of the disclosure, and should be appreciated that the scope of the disclosure is not limited by the embodiments. The scope of the disclosure should be construed by the following claims, and all technical spirits within equivalents thereof should be interpreted to belong to the scope of the disclosure.

What is claimed is:

1. An image projection device outputting an image to a screen, the image projection device comprising:
    an input unit receiving an image from an outside;
    a sensor unit sensing a viewer's position and gaze direction;
    a controller correcting the received image into a preset model based on the viewer's position and gaze direction sensed by the sensor unit; and
    an output unit outputting the preset model, wherein the preset model is a set of intersection points, which is Horopter surface, where gaze directions from corresponding positions in predetermined retinal areas of the viewer's left and right eyes intersect or meet, and
    wherein the controller corrects the received image by distorting the received image or adjusting a tilt of the received image, and adjusting the tilt of the received image includes creating a keystone effect.

2. The image projection device of claim 1, wherein the sensor unit senses the viewer's position by measuring a distance between the screen and the viewer.

3. The image projection device of claim 1, wherein the controller corrects the received image based on a Gullstrand eye model.

4. The image projection device of claim 1, wherein the image output from the output unit meets the viewer's angle of view of a predetermined value or more to prevent the viewer's gaze from escaping off the screen.

5. An immersive display device outputting an image, the immersive display device comprising:
    an image projection device including: an input unit receiving an image from an outside; a sensor unit sensing a viewer's position and gaze direction; a controller correcting the received image into a preset model based on the viewer's position and gaze direction sensed by the sensor unit; and an output unit outputting the preset model; and
    a screen projecting the image output from the immersive display device, wherein the preset model is a set of intersection points, which is Horopter surface, where gaze directions from corresponding positions in predetermined retinal areas of the viewer's left and right eyes intersect or meet, wherein the controller corrects the received image by distorting the received image or adjusting a tilt of the received image, and adjusting the tilt of the received image includes creating a keystone effect.

6. The immersive display device of claim 5, wherein the screen has the same shape as the preset model.

\* \* \* \* \*